United States Patent [19]
Lander

[11] 3,820,592
[45] June 28, 1974

[54] THERMALLY CONDUCTIVE MOUNTING MEANS

[75] Inventor: Jack Robert Lander, Walnut, Calif.

[73] Assignee: Electro-Module, Inc., Pomona, Calif.

[22] Filed: July 18, 1973

[21] Appl. No.: 380,341

[52] U.S. Cl........................... 165/47, 165/80, 165/86
[51] Int. Cl.............................................. F24h 3/00
[58] Field of Search.................. 165/47, 80, 86, 185

[56] References Cited
UNITED STATES PATENTS
3,652,903   3/1972   Erikson et al......................... 165/80

*Primary Examiner*—Charles Sukalo
*Attorney, Agent, or Firm*—Donald D. Mon; D. Gordon Angus

[57] ABSTRACT

There is disclosed a wedge set comprising a wedge block containing a slot with a movable wedge slidable within the slot leaving a space between the movable wedge and the juxtaposed wall of the wedge block. A screw shaft is threaded to the wedge block and to the movable wedge so that rotation of the screw slides the wedge relative to the block causing the said space to enlarge or decrease. A module plate or the like fitted in the space can thus be clamped by tightening the screw. The clamping is with very great pressure so that when the module plate becomes heated the heat is readily and efficiently conducted to and through the wedge block from where it can be dissipated in a heat sink, or transferred into a heat exchanger for disposition by other means such as waste water and the like.

12 Claims, 9 Drawing Figures

THERMALLY CONDUCTIVE MOUNTING MEANS

This invention relates to thermally conductive mounting means and more particularly to such a device adapted to easily mount and clamp a plate or panel subjected to heat so that the heat is effectively and efficiently conducted from the plate to the mounting from where it is dissipated.

There are many instances of structure or components being subjected to considerable heat, which if not adequately removed, can result in harmful effects or damage. To overcome the effect of such heat, provision is ordinarily made for removing the heat and dissipating it, for example in a heat sink.

A typical example of such heat generation is that which occurs in electrical power components which develop considerable heat in their operation. It is common to mount such electrical components, for example semi-conductors or other related equipment, on a module plate, and often there are a number of such module plates containing components organized in a general assembly of them. The module plates are commonly organized so that if a component on one of them becomes defective, the module can be removed and replaced by another module plate containing good components. The heat generated in the electrical components are conducted to the module plate, and through its mounting, usually to a heat sink. Since the need for limiting the amount of heat permitted to build up in the components is important, it is also important to carry away the heat efficiently through the mounting means.

Not only is it desirable to provide for efficient heat transfer, but also it is important to be able conveniently and rapidly to plug in and unplug such modules.

An object of the present invention is to provide a simple clamping mounting adapted rapidly to mount and dismount a high power module or the like, and when mounted to develop a heavy clamping pressure at the mounting position to facilitate the transfer of the heat.

In accordance with the present invention there is provided such mounting means characterized by a low thermal impedance, speed and ease of use and yet adaptable to a slide-in and slide-out mounting and dismounting technique.

The invention is carried out by use of a wedge block containing in its wedge slot a movable wedge slidable longitudinally relative to the slot and maintaining the juxtaposed slot wall of the wedge block and wall of the wedge parallel to each other with a space therebetween to receive the module plate where it can be clamped.

There is provided a screw shaft mounted to the movable wedge and to the opposite end of the wedge block so that turning of the shaft slides the movable wedge relative to the wedge block thereby decreasing or increasing the width of the space between the wedge block and the juxtaposed wall of the movable wedge according to the direction of rotation of the screw.

According to a preferred feature the screw shaft is provided with a screw end at each end and threadably attached to the wedge block and the movable wedge respectively.

According to another preferred feature, the screw ends are made with differential screw threads so that the travel of one screw end is different from the travel of the other screw end per revolution of the shaft, thereby providing an effective fine thread pitch permitting high tensile force on the screw shaft with relatively low torque, thereby facilitating application of pressure from the wedge. The screw is double acting, that is, it will drive the wedges apart as well as draw them together. Furthermore, no separate thrust bearing system is required, as the screws perform this function.

According to a desirable feature there is provided cooperating registration means in the movable wedge and the module plate to insure that the module plate is in the proper desired position.

According to another optional arrangement the screw ends of the screw shaft are threaded within inserts mounted for rotation in the end of the movable wedge and the opposite end of the wedge block respectively.

By use of this invention mounting and clamping of the module plate can be rapidly accomplished by a one-screw operation, which leaves the screw shaft in tension so that it will not loosen during vibration to which such equipment is frequently subjected.

The foregoing and other features of the invention will be better understood from the following detailed description and the accompanying drawings of which:

Figure 1:
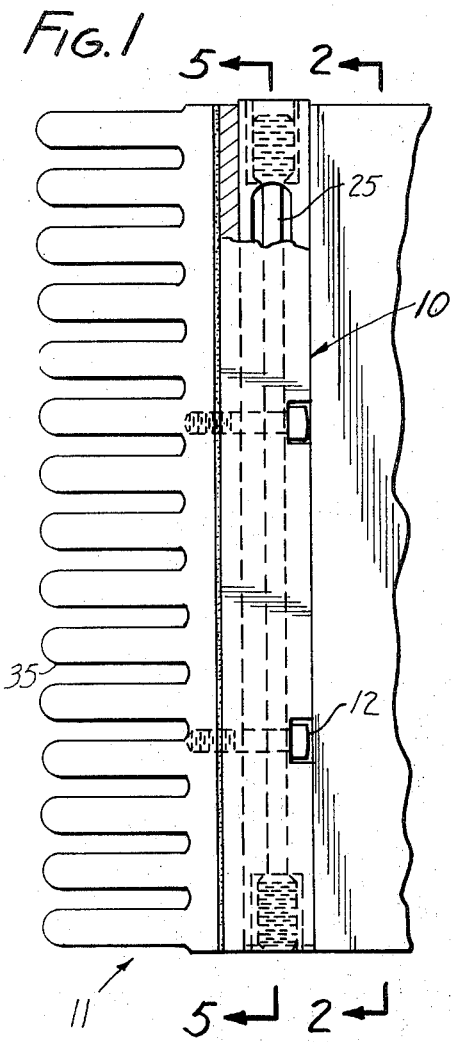
FIG. 1 is a side elevation view, partly in cross-section, of a thermally conductive mounting device comprising a wedge set with a screw shaft according to this invention showing a module plate adapted to be clamped, and showing a heat sink attached.

Referring to the embodiment of FIGS. 1 to 5 a wedge set 10 according to this invention is attached to a heat sink 11, by bolts 12, and a module plate 13 is in clamping relationship with the wedge set. The wedge set comprises a wedge block 14 having two sides 15 and 16 upstanding from a base portion 17. The inner wall 15a of side 15 lies in a plane perpendicular to the base 17. The inner wall 16a of side 16 lies in a plane oblique to that of wall 15a toward which it converges at one end of the wedge block. Thus there is formed in the wedge block a slot 18 bounded by the side walls 15a and 16a and the base 17, and due to the convergence of the side walls the slot is relatively narrow at one end of the wedge block and relatively wide at the other end.

Figure 2:
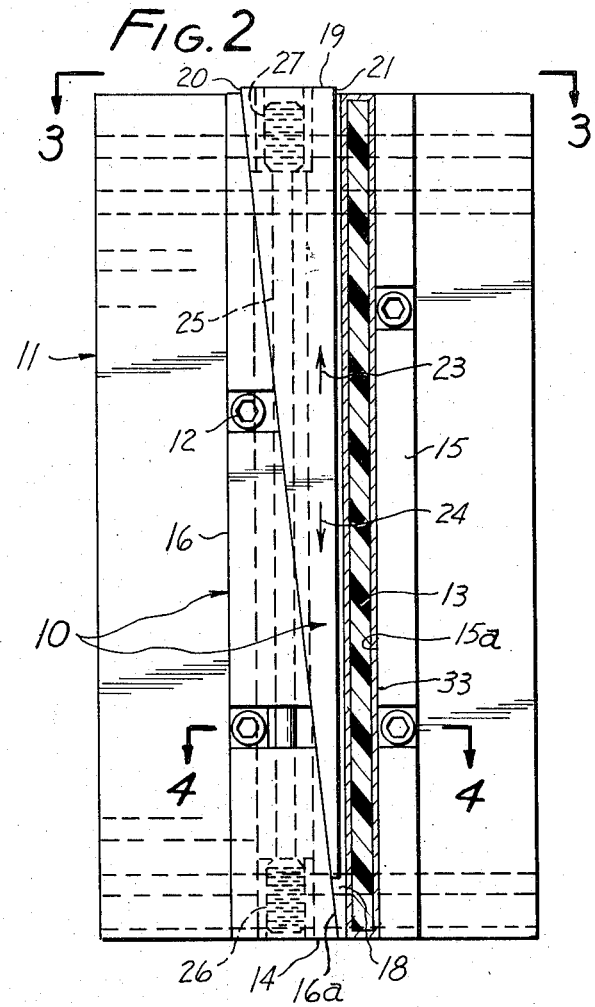
FIG. 2 is a face view of the arrangement of FIG. 1 looking from line 2—2 of FIG. 1.
Figure 4:
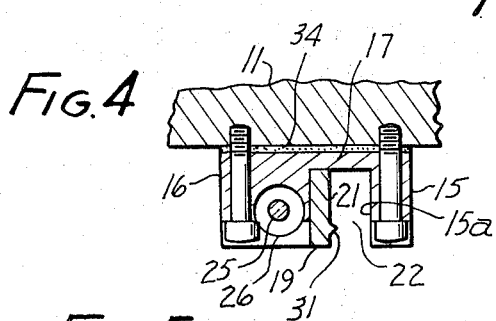
FIG. 4 is a cross-section view showing a detail taken at line 4—4 of FIG. 2.
Figure 3:
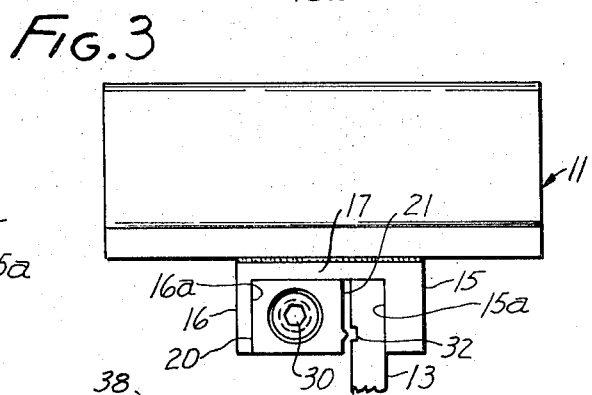
FIG. 3 is an end view of the arrangement looking from line 3—3 of FIG. 2.
Figure 6:
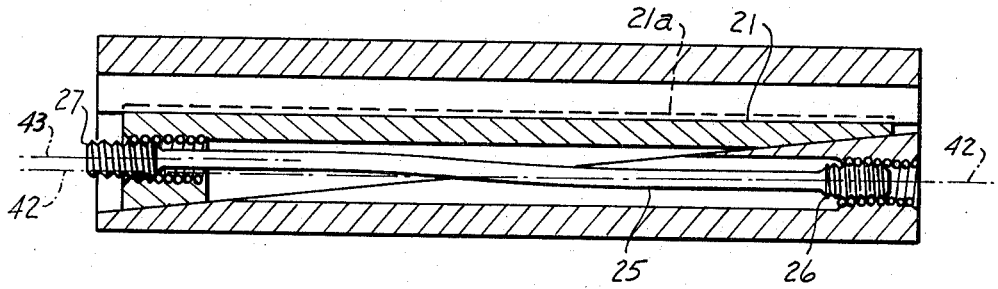
FIG. 6 is another cross-section view at line 5—5 of FIG. 1, but showing the module plate clamped in the mounting device.

A movable wedge 19 within the slot 18 is dimensioned and proportioned so that one of its side walls 20 conforms with, and can slide along, sidewall 16a while its other side 21 is parallel to, but spaced from, sidewall 15a. Accordingly one end of movable wedge 19 is relatively wide and the other end relatively narrow in correspondence with the changing width of the slot 18. The space 22 between side 21 of the movable wedge and side 15a of the wedge block, best seen in FIG. 4 which omits showing the module plate, is large enough to readily accommodate an edge of the module plate 13 when the movable wedge is retracted somewhat relative to the wedge block in the direction of arrow 23 (FIG. 2), as illustrated in FIGS. 2, 3 and 4. When however the movable wedge is moved relative to the wedge block in the direction of arrow 24 (FIG. 2), the side 21 of the wedge moves laterally to a position 21a, as shown in FIG. 6 which does not show the module plate. When the module plate is present the side 21 clamps the side of the module plate 13 at its edge, between this side of the movable wedge and the side 15a of the wedge block.

Means are provided for sliding the movable wedge in the direction of arrows 23 or 24, this means comprising a screw shaft 25 enlarged at both ends to provide threaded ends or studs 26 and 27 which thread into respective thread inserts 28 and 29, the insert 29 being at the larger end of the movable wedge and the insert 28 being at the opposite end of the wedge block. The inserts 28 and 29 are well-known devices in the form of hard helical members incorporated into bores of the material of which the wedge and wedge block are made. The portions of these inserts which protrude from the interior walls of the bores serve as threads for the threaded studs 26 and 27.

There is a differential pitch between threads 26 and 27 and correspondingly between threads 28 and 29 so that for each revolution of the shaft 25 the stud 26 advances further into the movable wedge than stud 27 advances into the wedge block, although both threads go in the same direction. For example stud 26 may be a 10-32 thread and stud 27 may be a 10-24 thread, which makes the effective pitch 96, that is the movable wedge moves one ninety-sixth inch relative to the wedge block. A recessed bolt head 30 is formed within the stud member 27 for engagement by a wrench which can turn the shaft 25 in either direction to slide the movable wedge in the direction of either arrow 23 or 24.

It will often be desirable to establish the longitudinal position of the module plate 13 relative to the movable wedge and this is accomplished by provision of a tooth or protuberance 31 which registers with a corresponding notch or groove 32 in the module plate as best seen in FIGS. 3 and 4. Alternatively the tooth could be placed in wall 15a with the notch in the juxtaposed side of the module plate.

Figure 5:
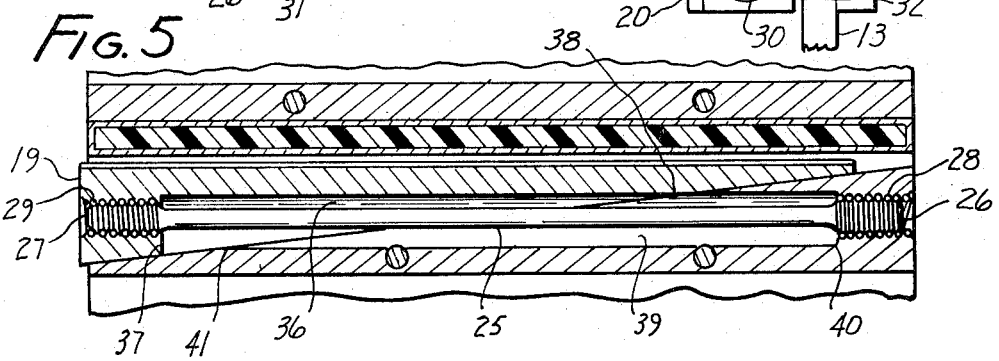
FIG. 5 is a cross-section view taken at line 5—5 of FIG. 1, showing the module plate unclamped, but in the position to be clamped.

From the foregoing description it is seen that the module plate is readily plugged into the wedge set while the movable wedge is in the retracted position shown in FIGS. 2 and 5, following which it may be tightly clamped by turning the screw shaft in the direction to slide the movable wedge in the direction of arrow 24 until the module plate is clamped under great pressure. To enhance the thermal conductivity from the module plate to the wedge set the surfaces of the module plate which engage the movable wedge and the surface 15a of the wedge set, are preferably coated with a layer 33 of thermal grease. Furthermore to enhance the thermal conductivity between the wedge set and the heat sink 11 a similar coating 34 of thermal grease is applied therebetween as shown in FIG. 4. When the module plate is tightly clamped in the wedge set the thermal grease is expelled except in the minute irregularities of the metal members which do not come into contact with each other, and in these areas the thermal conductivity is enhanced. A similar condition applies between the base of the wedge set and the heat sink. Heat is dissipated from the heat sink in a well-known manner by the use of fins 35 through which air or other fluid may flow or be blown. Another well-known manner of dissipating the heat may be through attachment of pipes or tubes in which water or other fluids flow, and the like.

To accommodate the condition that the end of the screw shaft containing stud head 27 lies within the movable wedge while the other end of the screw shaft containing stud head 26 lies within the opposite end of the wedge set, a longitudinal groove 36 best seen in FIG. 5, is formed in the side 20 of the movable wedge commencing at a position 37 just inside threads 29 with its base extending parallel to the other side 21 6 of the movable wedge where it becomes flush with the wedge surface 20 at a position 38. A similar groove 39 is formed in the wedge block commencing at a position 40 just inside the screw threads 28 with its base extending parallel to the base of groove 36 until it meets the side 16a of the wedge block. Since the two grooves 36 and 39 open into each other the shaft 25 is free to extend from within the wedge block to within the movable wedge. When the movable wedge is moved in the direction of arrow 24 to clamp a module plate or panel its side 21 moves toward side 15a of the wedge block. This causes the longitudinal axis 42 of stud head 26 to become displaced from the longitudinal axis 43 of stud head 27 (FIG. 6) hence the shaft 25 is strained to a double bend at an intermediate position. To prevent binding due to this action of the shaft in twisting at the double bend while it is being turned by a wrench, the material of the shaft should be made resilient enough to resist binding. This indicates the use of a shaft which is relatively long as compared with its diameter.

Figure 7:
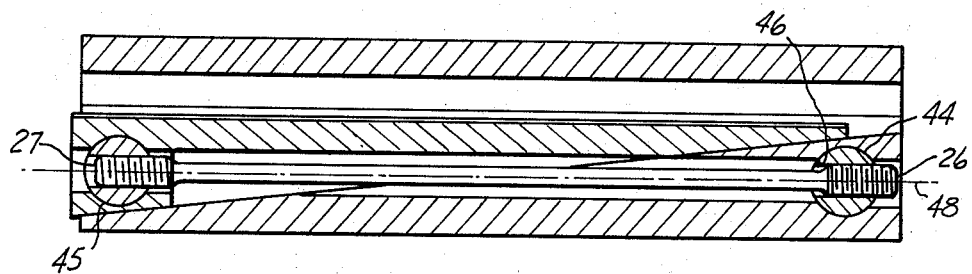
FIG. 7 is a cross-section view corresponding to that of FIG. 5, but showing the screw shaft connected with the wedge set in a different arrangement.
Figure 8:
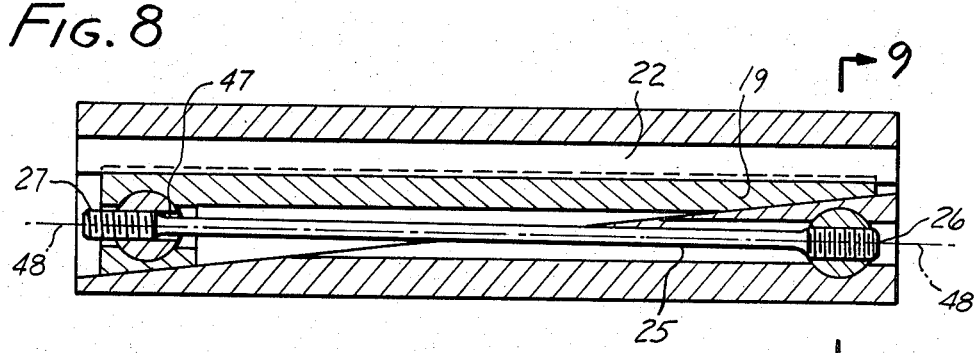
FIG. 8 is a cross-section view showing the wedge set of FIG. 7 in its clamped position relative to the module plate.
Figure 9:
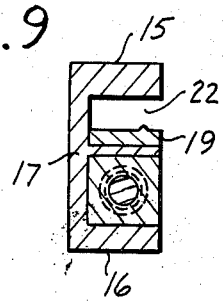
FIG. 9 is a cross-section view taken at line 9—9 of FIG. 8.

In the event it be desired to use a shaft which need not bend while clamping a module plate or panel there may be used the modification shown in FIGS. 7 to 9, which is similar to that of FIGS. 1 through 6, except that in FIGS. 7 through 9, there is substituted for the screw inserts 28 and 29 (FIG. 5), rotatable shafts or pins 44 and 45 mounted for rotation in the wedge block and the movable wedge. Each of the pins 44 and 45 has centrally through it a hole 46 and 47 threaded to correspond with the respective screw threads at 26 and 27. Thus when the shaft 25 is rotated by the wrench as previously described, the screw ends of the shaft move through the pins according to the direction of rotation of the shaft and the pitch of the threads. Instead of bending as in the embodiment shown in FIG. 6 the shaft does not bend when the movable wedge slides relative to the wedge block. Instead the pins 44 and 45 rotate somewhat in their sockets so that the longitudinal axis 48 of the shaft is maintained in a straight line as shown in FIG. 8, but somewhat oblique to the sides of the space 22 when the module plate is fitted into it and clamped.

The screw shaft in either embodiment may be made of a metal such as beryllium-copper, spring steel or some stainless steels and should be round and solid. Any of these metals can be made into a thin shaft flexible enough to bend to a shallow S curve and be turned without binding.

If desired the shaft may be given a resilient bias toward the base of the wedge block, which will tend to keep the wedge in contact with the base.

Another refinement which may be used is to make the inner walls 15a and 16a of the wedge block converge very slightly toward each other away from the base. Thus, the walls instead of being exactly 90° to the base, may be something like 89°. Hence when the wedge is squeezing the module plate the effect will be to deform the side walls of the wedge block so that they become substantially parallel to each other at 90° to the base.

It will be recognized that by the present invention there is provided a relatively simple mounting and clamping device which enables a panel or plate to slide in and out of the device readily and to be clamped and unclamped by simply turning a screw. The device furthermore provides great pressure and attendant high thermal conductivity at the mounting which efficiently conducts heat away from the plate.

It will be understood that the embodiments of the invention illustrated and described herein are given by way of illustration and not of limitation, and that modification or equivalents or alternatives within the scope of the invention may suggest themselves to those skilled in the art.

What is claimed is:

1. Mounting means for clamping, and conducting heat from, a panel adapted to be mounted therein comprising:
   a wedge block having a slot with a base and first and second converging sides, within the block,
   a movable wedge having first and second converging sides, placed within the slot,
   the first side of the wedge being in contact with the first side of the slot and the second side of said wedge being juxtaposed and parallel to, and leaving a space from, the second side of said slot, whereby an edge of said panel may be plugged into said space,
   a shaft, means rotatably attaching a first end of said shaft to one end of said wedge and means rotatably attaching the second end of said shaft to the opposite end of said block,
   thereby permitting sliding of said wedge along said slot while said first sides remain in contact with each other and corresponding change of the dimension across said space and clamping of the plugged-in part of the panel between the second surface of the wedge and the second surface of the wedge block.

2. Mounting means according to claim 1 in which the second side of said wedge contains a first registration means and the adjacent side surface of said panel within said space contains a second registration means which registers with the first registration means and prevents relative sliding between the wedge and the panel.

3. Mounting means according to claim 1 in which said shaft is flexible so that it bends resiliently when the wedge slides relative to the wedge block.

4. Mounting means according to claim 1 in which the means rotatably attaching the first end of said shaft to one end of said wedge comprises threads at said first end of said shaft and corresponding threads on said one end of said wedge.

5. Mounting means according to claim 4 in which the means attaching the second end of said shaft to said opposite end of said block comprises threads at said second end of said shaft and corresponding threads on said opposite end of said block.

6. Mounting means according to claim 1 in which each of said sides is straight and said one end of said wedge has a greater transverse dimension than its other end, and said shaft extends substantially parallel to said slot.

7. Mounting means according to claim 6 in which each of said first sides contains a longitudinal groove for a distance along its length, said grooves being juxtaposed and in communication with each other thereby providing a cavity which accommodates said shaft.

8. Mounting means according to claim 1 in which the means rotatably attaching a first end of said shaft to one end of said wedge comprises a pin rotatably mounted to said wedge and provided with threads, the first end of said shaft being provided with threads engaging those of said pin, and the means rotatably attaching the second end of said shaft to the opposite end of said block comprises a second pin rotatably mounted in the block and provided with threads, said second end of said shaft being provided with threads corresponding to those of the second pin.

9. Mounting means according to claim 5 in which the threads at said first and second ends have the same direction but different pitches.

10. Mounting means according to claim 9 in which the pitches of the threads at the two ends are such that the movable wedge moves relative to the wedge block.

11. Mounting means according to claim 3 in which the flexible shaft has a resilient bias tending to hold the movable wedge against the base of the wedge block.

12. Mounting means according to claim 1 in which a heat sink is connected to the wedge block so that heat is readily conducted from the panel through the wedge block to the heat sink.

* * * * *